United States Patent
Munro et al.

(10) Patent No.: US 12,467,834 B2
(45) Date of Patent: Nov. 11, 2025

(54) INDOOR AIR QUALITY MONITOR

(71) Applicant: Flutterlab Ltd, Chester (GB)

(72) Inventors: Nicholas Munro, Chester (GB); Gabriele D'Amone, London (GB)

(73) Assignee: FLUTTERLAB LTD, Chester (GB)

( * ) Notice: Subject to any disclaimer, the term of this patent is extended or adjusted under 35 U.S.C. 154(b) by 222 days.

(21) Appl. No.: 18/021,609

(22) PCT Filed: Aug. 19, 2021

(86) PCT No.: PCT/GB2021/052152
§ 371 (c)(1),
(2) Date: Feb. 16, 2023

(87) PCT Pub. No.: WO2022/043664
PCT Pub. Date: Mar. 3, 2022

(65) Prior Publication Data
US 2023/0314291 A1    Oct. 5, 2023

(30) Foreign Application Priority Data

Aug. 24, 2020 (GB) .................................. 2013185

(51) Int. Cl.
G01N 1/22 (2006.01)
G01N 1/24 (2006.01)
G01N 33/00 (2006.01)

(52) U.S. Cl.
CPC ........... *G01N 1/24* (2013.01); *G01N 33/0062* (2013.01); *G01N 2001/245* (2013.01)

(58) Field of Classification Search
CPC ................. G01N 1/24; G01N 33/0062; G01N 2001/245; G01N 2001/2285;
(Continued)

(56) References Cited

U.S. PATENT DOCUMENTS 3,833,305 A     9/1974 Porter et al.
10,697,947 B1 *  6/2020 Armitage ................ H02S 40/30
(Continued)

FOREIGN PATENT DOCUMENTS

CA     3007379 A1 * 12/2019
CN     1632556 A     6/2005
(Continued)

OTHER PUBLICATIONS

European Patent Office, International Search Report for PCT App. No. PCT/GB2021/052152, Feb. 28, 2022, pp. 1-5.
(Continued)

*Primary Examiner* — Robert R Raevis
(74) *Attorney, Agent, or Firm* — Cahn & Samuels, LLP

(57) ABSTRACT

The invention provides an indoor air quality monitor (10) which has: a housing (12) providing an air intake (24) leading via a flow path, which is formed within the housing and which comprises a flow chamber (70), to an air outlet (28); a fan arranged to propel air from the air intake (24) through the flow path to the air outlet (28); at least one sensor (56, 58, 60, 62) which is for sensing at least one air pollutant, the sensor (56, 58, 60, 62) being exposed to air in the flow chamber (70); and an air guide arrangement (46, 48, 64, 66, 74) which is downstream of the air intake (24) in the flow path and which forms a plurality of flow passages (76, 78, 80) through each of which air passes in operation of the indoor air quality monitor to reach the flow chamber (70).

11 Claims, 12 Drawing Sheets

(58) Field of Classification Search
CPC ............ G01N 1/2273; G01N 33/0047; G01N 33/0063; G01N 33/0009; G01N 33/0027; G01N 33/004; G01N 2001/2276; G01N 2001/2279; G01N 2001/247
USPC ... 73/1.06, 23.31, 31.01–31.04, 863, 863.33, 73/864.73, 864.81; 34/627–634
See application file for complete search history.

(56) References Cited

U.S. PATENT DOCUMENTS

| | | |
|---|---|---|
| 2013/0260668 A1 | 10/2013 | Stakutis et al. |
| 2014/0053628 A1* | 2/2014 | Lockhart ................ G01N 25/58 73/25.04 |
| 2016/0223220 A1 | 8/2016 | Berg et al. |
| 2017/0023457 A1 | 1/2017 | Hart et al. |
| 2018/0156727 A1 | 6/2018 | Zhang et al. |
| 2020/0033017 A1* | 1/2020 | Brown ............... G01N 33/0063 |

FOREIGN PATENT DOCUMENTS

| | | |
|---|---|---|
| CN | 204101532 U | 1/2015 |
| CN | 105909560 A | 8/2016 |
| EP | 3667194 A1 | 6/2020 |
| GB | 2539449 A | 12/2016 |
| JP | H08192617 * | 7/1996 |
| WO | 2015/009350 A1 | 1/2015 |

OTHER PUBLICATIONS

European Patent Office, Written Opinion for PCT App. No. PCT/GB2021/052152, Feb. 28, 2022, pp. 1-12.
UK Intellectual Property Office, Search and Examination Report for UK App. No. GB2013185.0, Nov. 25, 2020, pp. 1-8.
European Patent Office, English abstract for CN1632556A, printed on Feb. 16, 2023.
European Patent Office, English abstract for CN204101532U, printed on Feb. 16, 2023.
European Patent Office, English abstract for CN105909560, printed on Feb. 16, 2023.

* cited by examiner

INDOOR AIR QUALITY MONITOR

The present invention relates to monitoring of indoor air quality.

Indoor air quality is a major concern to building managers, businesses and indeed to individuals, given the impact it can have on the health of the occupants of a building and on their productivity. A range of different pollutants is commonly found in the built environment that can impact on human health and wellbeing. A report from the World Health Organisation in 1984 suggested that up to 30% of new and remodelled buildings may be subject to complaints related to poor air quality. Symptoms thought to arise from so-called "sick building syndrome" can include headache; eye, nose and throat irritation; fatigue; dizziness and nausea. It is though that poor IAQ can have a major effect on the productivity of a building's occupants. But it is also associated with long-term health problems including respiratory disease, heart disease and cancer.

Levels of pollution are often higher within buildings than outside them. Sources of pollutants include fuel-burning combustion devices, tobacco products, a range of building materials and furnishing materials, cleaning products, and personal care products. Outdoor air pollution can also reach the indoor environment of course. Pollutants in the air inside buildings can include (a) air-borne particles e.g. from diesel exhausts, dust and smoke; and (b) volatile organic compounds (VOCs), including formaldehyde, emitted by certain solid and liquid materials commonly found in buildings. Another aspect of IAQ is carbon dioxide concentration. In a poorly-ventilated building, the increased concentration of $CO_2$ in the air exhaled by the building's occupants can raise its concentration appreciably in the ambient air, and excessive atmospheric $CO_2$ is believed to have a range of negative impacts on human health.

Air humidity can affect the well-being of a building's occupants. Excessively high and low humidity are both undesirable.

Air quality in a building may be affected by transient events whose effects are short-lived, as for example when a chemical spray is released into the atmosphere.

Other aspects of the indoor environment—not directly related to IAQ—that have implications for the well-being of the occupants include ambient noise and temperature.

There is a host of reasons why it is desirable to monitor IAQ. Monitoring may make possible a range of remedial measures to improve air quality such as increasing ventilation, or identifying and removing sources of pollutants. By monitoring the effectiveness of such measures can be determined. Building managers may wish to monitor air quality as a matter of best practice, to ensure a healthy environment.

Self-contained devices for monitoring IAQ are known in the patent literature and are commercially available.

GB2539449, for example, discloses an air quality monitor with a roughly toroidal hollow housing, sensors being carried on a broadly cuboidal body at its centre. The device is configured to sense VOCs, $CO_2$ and reducing compounds. It has a fan to exhaust air along the housing's approximate axis of symmetry and an air intake in a side wall. The pattern of air flow that is achieved by this arrangement as the air passes over the sensors is not clear from the document, but it may be assumed that it is somewhat complex, and potentially turbulent in various places.

US2013260668A1 describes a system including an air quality "control module", in the context of control of an HVAC (heating, ventilation and air conditioning) system, but this module is configured to compare incoming air from the outside against outgoing stale air to provide relative measurements.

US2017023457A1 concerns a portable ambient air quality monitor in which particulate material is detected by projecting laser light into an air flow and detecting scattering of that light by suspended particulates, the detection being made using a photodiode.

An example of a commercially available IAQ monitor is the Laser Egg from Kaiterra (kaiterra.com) which is a self-contained puck-shaped device with a display screen on its face. Numerical simulations carried out by one of the present inventors suggest that air flow through the device is far from optimal.

The inventors have identified three areas of deficiency in the prior art IAQ monitors known to them.

The first of these areas concerns management of air flow through the device. The inventors have recognised that existing devices typically suffer from one or more of the following problems:

airflow through the device is turbulent and/or contains recirculating zones, which cause local variations in the residence time of air (and hence of the air-borne pollutants being sensed). The result can be impairment of accuracy of measurement and/or an increase in the response time of the device. That is, poor management of airflow can impair the ability of the device to react quickly to changes of air quality, with the result that transient effects may be missed altogether;

inhomogeneous flow. The rate of air flow through the device may vary markedly from one point to another, which is undesirable in terms of accuracy;

excessive chamber volume. A chamber of large volume—and especially of large cross section with respect to the flow—increases the time it takes for air in the chamber to reach equilibrium with the ambient air, and so increases the response time of the device;

poor optimisation of flow with respect to the sensors. Certain sensors perform optimally when airflow passes across (parallel to) their upper face. This optimal flow pattern is not achieved in many existing devices.

Since an IAQ monitor is typically a mass-produced item whose cost of manufacture is important to its commercial success, suitable management of airflow needs to be achieved in a manner that is constructionally simple and economical.

A second problem associated with many prior art devices concerns calibration and maintenance. Certain sensors remain accurate for a finite period before they require re-calibration or replacement. A means is needed to facilitate this process in a way that is quick and convenient for the user. Sensors may also be affected by accretion of dust or by contamination.

A third problem concerns the manner in which air quality information is conveyed to users. Certain known devices are configured, for example, to output air quality data digitally through a WiFi network to an application running on a mobile device. It is also known to route data through a wide area network to a remote server which collates and analyses data from multiple sources. And IAQ monitors are known which carry electronic displays to provide a range of data. But it is likely that many occupants of a room will pay little attention to an IAQ monitor from day to day, and the inventors have recognised that a very simple and conspicuous signalling system is desirable in this context, to give users reassurance when air quality is good and an immediate and clear signal when it is poor. This needs to be achieved in a manner that is simple in terms of manufacture, and is able to provide an aesthetically attractive effect.

According to a first aspect of the present invention, there is an indoor air quality monitor comprising:

a housing providing an air intake leading via a flow path, which is formed within the housing and which comprises a flow chamber, to an air outlet;

a fan arranged to propel air from the air intake through the flow path to the outlet;

at least one sensor which is for sensing at least one air pollutant, the sensor being exposed to air in the flow chamber; and an air guide arrangement which is downstream of the air intake in the flow path and which forms a plurality of flow passages through each of which air passes in operation of the indoor air quality monitor to reach the flow chamber.

By dividing the air flow between a plurality of flow passages upstream of the flow chamber, the present invention makes it possible to exercise control over the pattern of air flow in that chamber, and especially can provide a substantially laminar and homogenous flow pattern. This makes it possible to reduce residence time in the flow chamber and correspondingly to reduce the time needed for the monitor to react to changes in ambient pollutant levels.

According to a second aspect of the present invention, there is an indoor air quality monitor ("IAQ monitor") comprising:

a housing providing an air intake and an air outlet which communicate via a flow chamber;

a fan arranged to propel air from the air intake to the air outlet via the flow chamber;

at least one sensor for sensing at least one air pollutant, the sensor being exposed to air in the flow chamber and being configured to provide a sensor output indicative of air quality in the flow chamber;

a microprocessor configured to receive and process the sensor output; and at least one wired or wireless interface device for outputting sensor data in digital form;

wherein the sensor is mounted on a carrier which is removably mountable within the housing, enabling the carrier to be withdrawn from the housing for replacement, servicing and/or calibration of the sensor.

By mounting the sensor on a removable carrier, the invention provides for the sensor to be conveniently removed from the housing for calibration, servicing and/or replacement.

In accordance with a third aspect of the present invention, there is an indoor air quality monitor ("IAQ monitor") comprising:

a housing providing an air intake and an air outlet which communicate via a flow chamber;

a fan arranged to propel air from the air intake to the air outlet via the flow chamber;

at least one sensor for sensing at least one air pollutant, the sensor being exposed to air in the flow chamber and being configured to provide a sensor output indicative of air quality in the flow chamber;

a microprocessor configured to receive and process the sensor output; and at least one wired or wireless interface device for outputting sensor data in digital form;

wherein the housing's interior is divided by an arrangement of air guides into (a) a first zone forming an air flow path from the air intake to the air outlet, the first zone including the flow chamber and containing the at least one sensor; and (b) a second zone which is isolated from the flow path, the second zone containing the microprocessor and the interface device.

By dividing the space within the housing into a zone that receives the flow of air and contains the sensor, and a separate zone that is excluded from the air flow, this aspect of the inventions provides various advantages. Potentially sensitive electronic components are protected from contamination by the air flow. Any contamination of the air flow itself by such components is prevented. Effects such as heating due to energy given off by the active electronic components including the microprocessor and the wireless interface, which might otherwise have a bearing on outputs of certain sensors, are prevented.

In accordance with a fourth aspect of the present invention, there is an indoor air quality monitor ("IAQ monitor") comprising:

a housing providing an air intake and an air outlet which communicate via a flow chamber;

a fan arranged to propel air from the air intake to the air outlet via the flow chamber;

at least one sensor for sensing at least one air pollutant, the sensor being exposed to air in the flow chamber and being configured to provide a sensor output indicative of air quality in the flow chamber;

a microprocessor configured to receive and process the sensor output; and an illuminable signal panel; and at least one electrically driven light source for illuminating the signal panel, wherein the hue and/or other visible quality of the light emitted by the light source is adjustable by the microprocessor, the microprocessor being further configured to adjust the quality of the light emitted by the light source in dependence on the categorisation of the air quality.

The illuminable signal panel may comprise an edge lit transparent or translucent body of glass or polymer material, and can provide a very simple and effective means of signalling the air quality to occupants of a room.

In accordance with a fifth aspect of the present invention, there is an indoor air quality monitor ("IAQ monitor") comprising:

a sensor-unit housing providing an air intake and an air outlet which communicate via a flow chamber;

a fan arranged to propel air from the air intake to the air outlet via the flow chamber;

at least one sensor for sensing at least one air pollutant, the sensor being exposed to air in the flow chamber and being configured to provide a sensor output indicative of air quality in the flow chamber;

a microprocessor configured to receive and process the sensor output;

at least one wired or wireless interface device for outputting sensor data in digital form; and a base unit;

wherein the sensor-unit housing and the base unit are configured to couple to one another releasably.

The releasable coupling between the sensor-unit housing and the base unit may be made using magnets.

Specific embodiments of the present invention will now be described, by way of example only, with reference to the accompanying drawings, in which:—

Figure 5A:
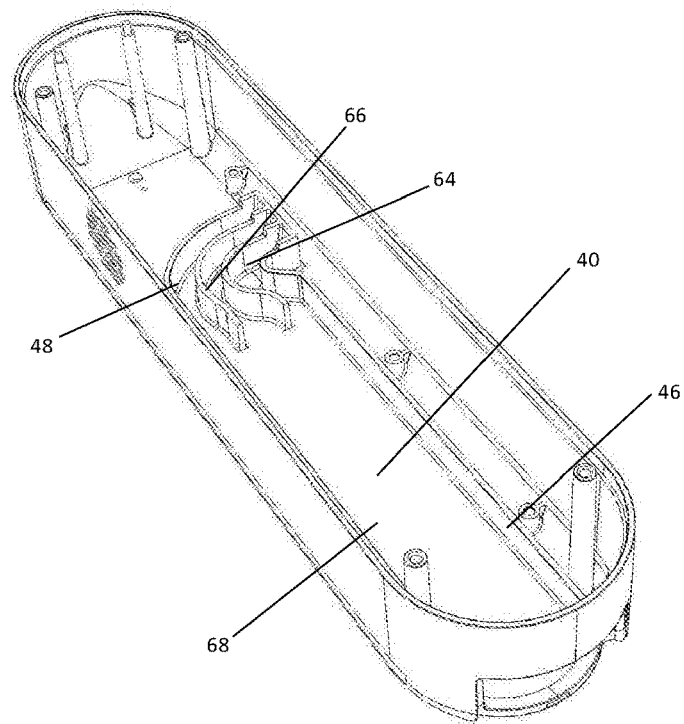
Figure 5B:
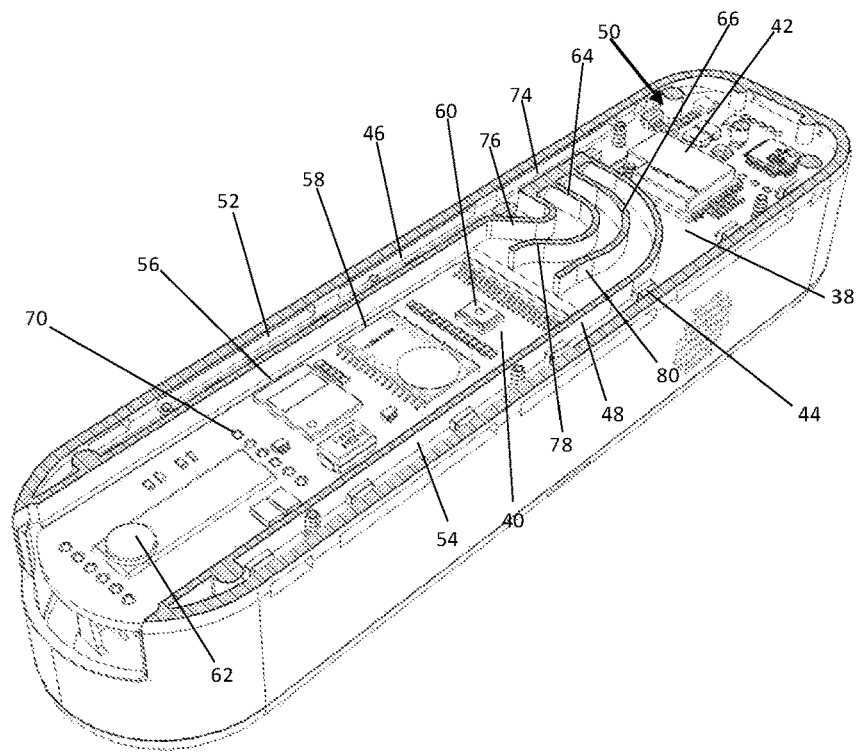
Figure 6:
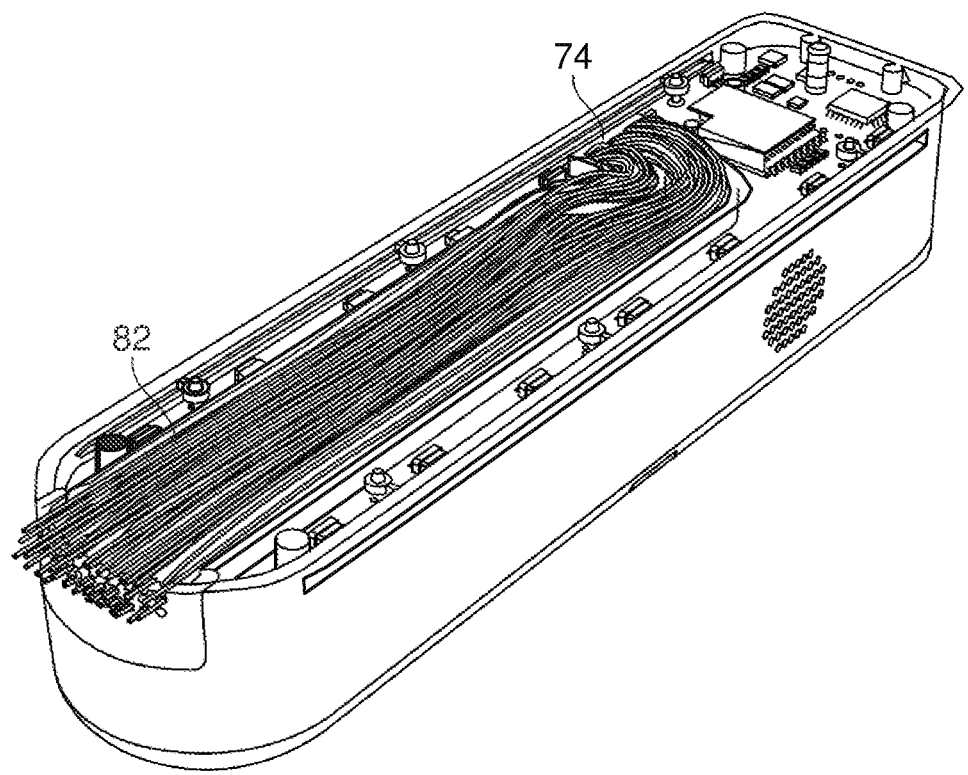
Figure 7:
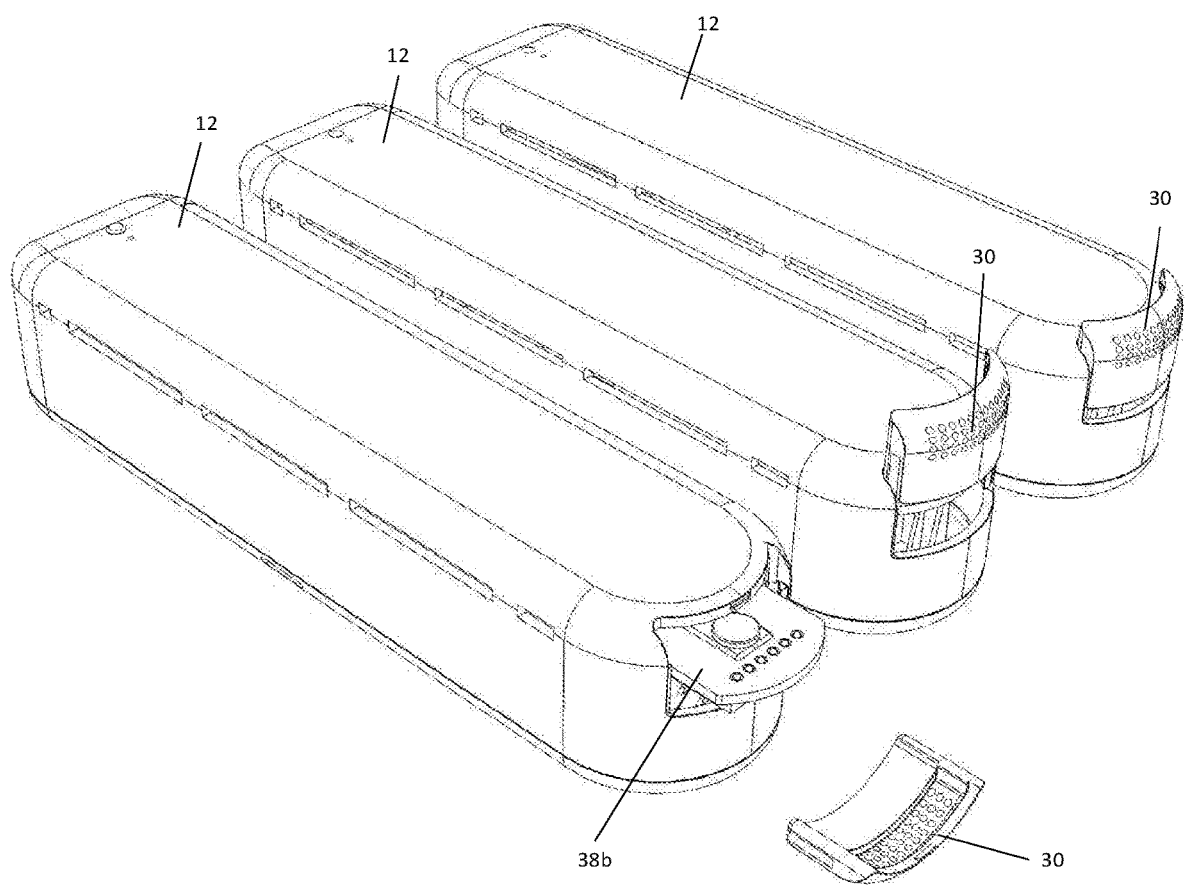
Figure 8:
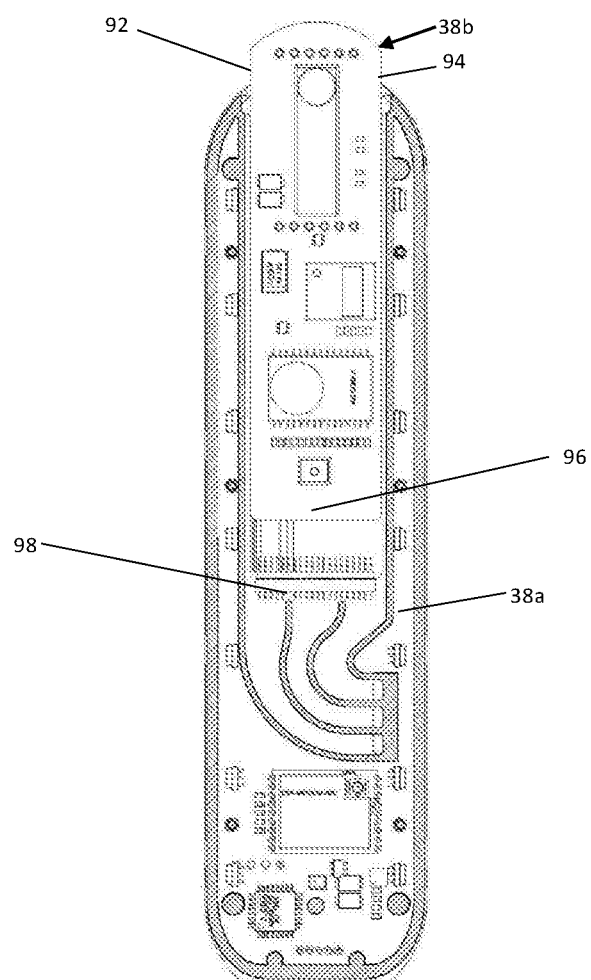
Figure 9:
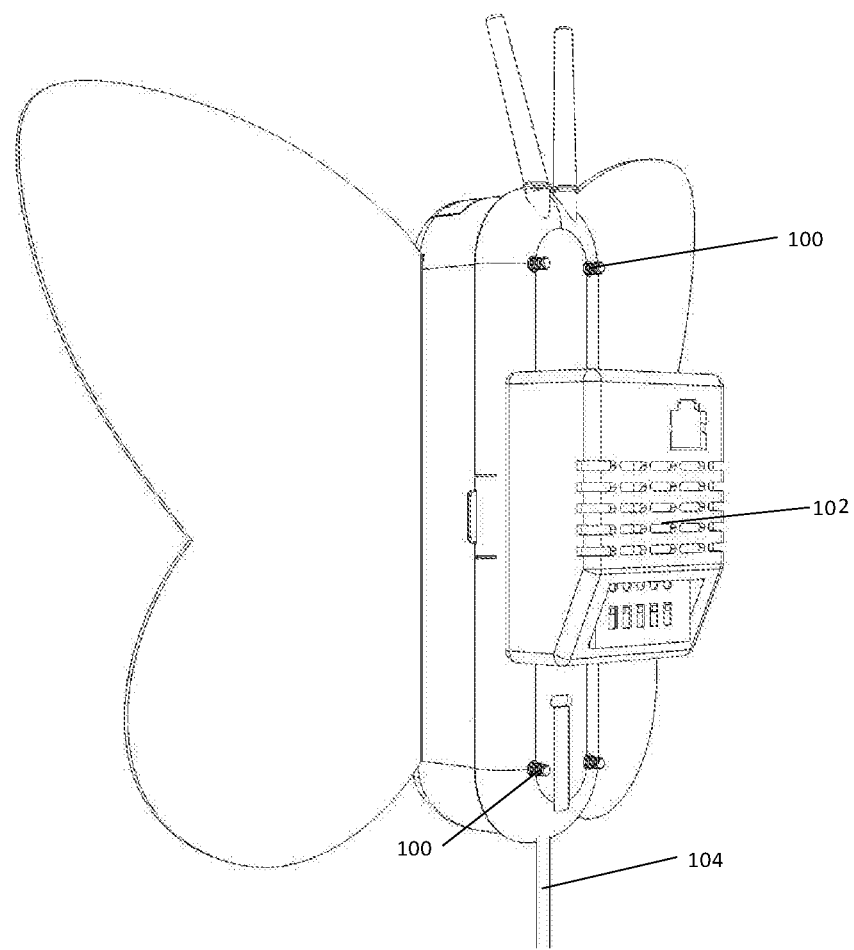
Figure 10:
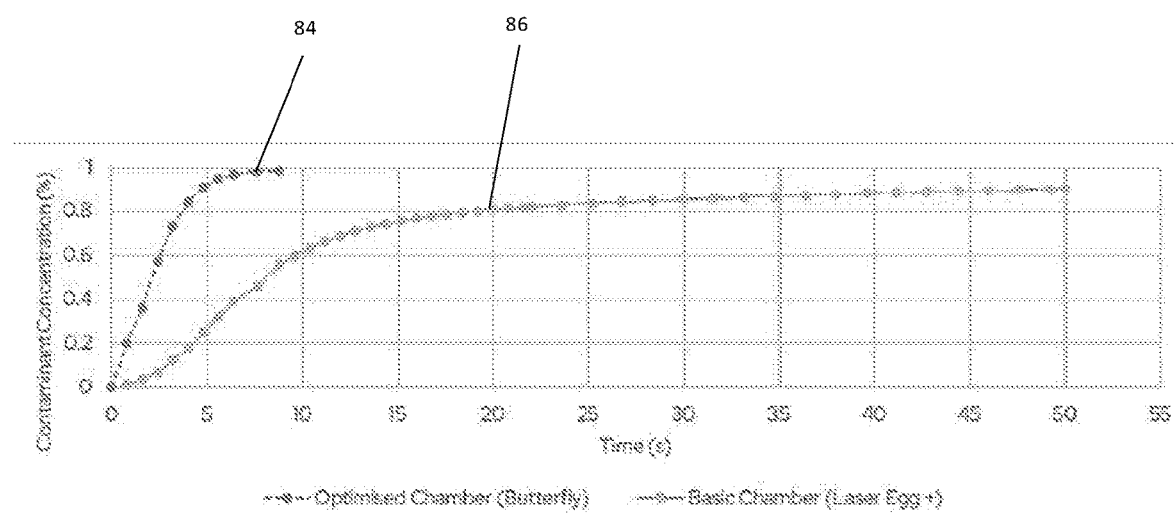
Figure 11:
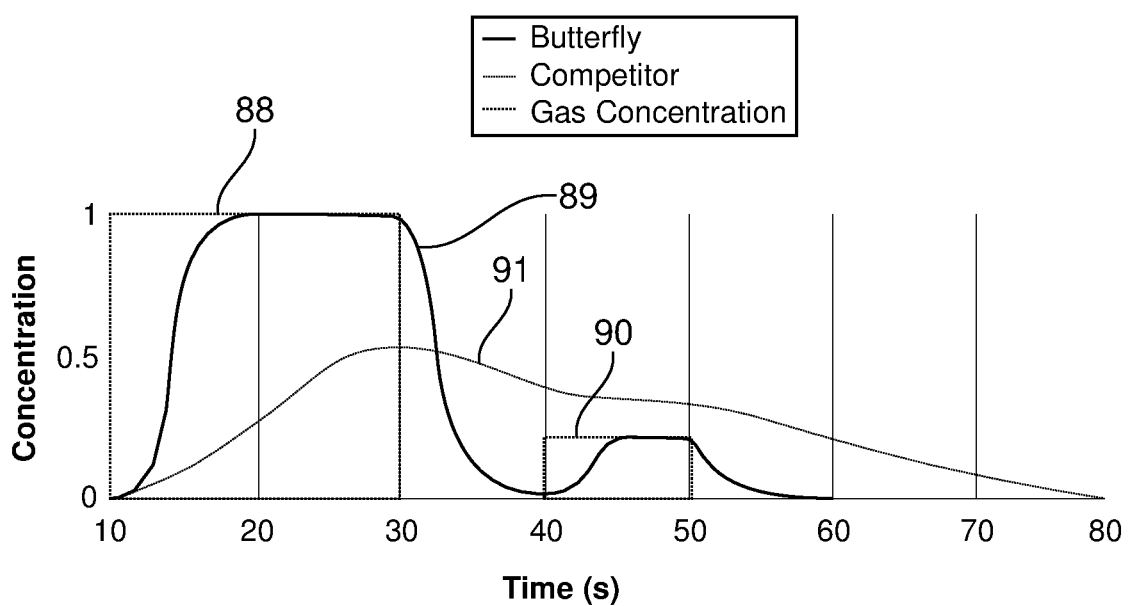
Figure 12:
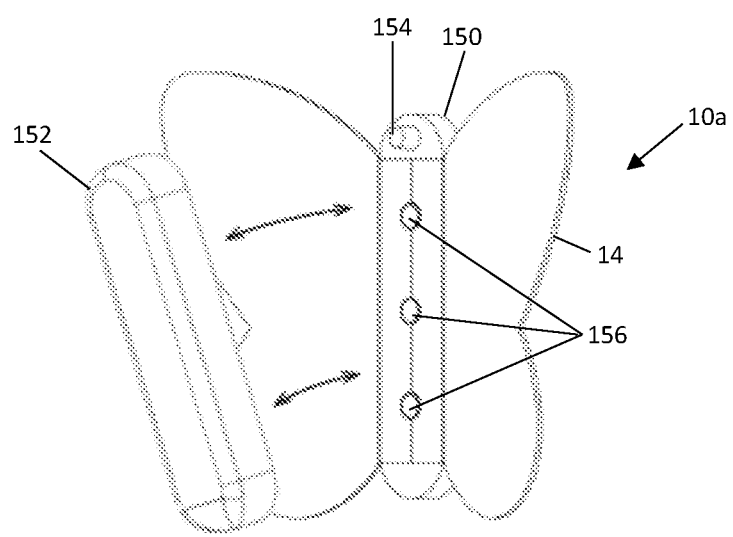

FIG. 5 includes, on the left-hand side, a view of the underside of the cover portion of the housing, and on the right-hand side a view of the housing and its internal components from which a top panel of the cover has been omitted, to reveal internal features;

FIG. 6 shows a view of the housing and its internal components similar to that found in FIG. 5, but also includes a set of flow paths generated by computer simulation and representing the routes taken through the housing by air;

FIG. 7 illustrates how the housing can be opened for renewal of sensor components, and shows three different states of the housing;

FIG. 8 is a plan view of the housing with a top panel of the housing omitted to reveal the circuit board and other internal components;

FIG. 9 is a view of the whole IAQ monitor viewed from behind and to one side, along with a peripheral unit on which the IAQ monitor is mounted;

FIG. 10 is a graph representing the rate at which internal contaminant concentration equalises with external contaminant concentration in (a) the present IAQ monitor and (b) a prior art device numerically modelled by the present inventor;

FIG. 11 is a graph illustrating the time variation of contaminant concentration in these two devices, in a situation where the ambient concentration of the contaminant varies; and FIG. 12 depicts a further IAQ monitor embodying the present invention.

Figure 1:
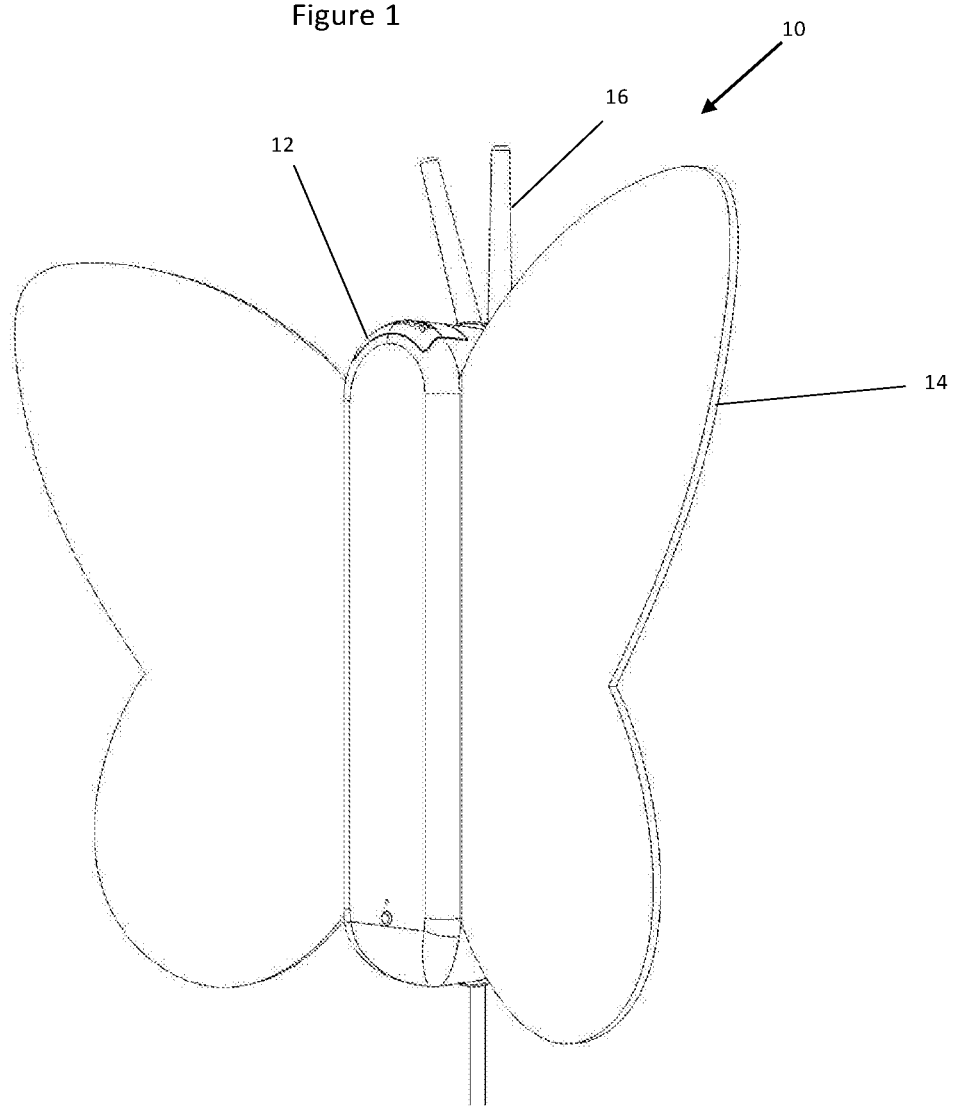
FIG. 1 shows an indoor air quality monitor ("IAQ monitor") embodying the present invention viewed from the front and to one side.

Referring to FIG. 1, the present embodiment is an IAQ monitor 10 comprising a housing 12 which in this embodiment carries a pair of illuminable signal panels 14. For the sake of aesthetics, the present embodiment has the general form of a butterfly, where the housing 10, being elongate, represents the creature's body and the signal panels 14 represent its wings. To add to the effect, the housing carries, in the present embodiment, a pair of projections 16 representing antennae. Of course, the outward appearance of the IAQ monitor 10 may be quite different in other embodiments of the invention.

The IAQ monitor 10 carries out repeated and frequent sampling of multiple aspects of the quality of the air in its environment and, in the present embodiment, outputs resultant sensor data through any of (a) an unwired local area network, which includes WiFi in the present embodiment as well as the mobile (cellular) telephony network, although other unwired forms of communication may be adopted; (b) a wired local area network; and/or (c) the signal panels 14. The sensor data may subsequently be transmitted through a wide area network which may be the internet.

The IAQ monitor 10 is essentially self-contained, in that it includes all of the functionality needed to sense and report air quality in its environment, although data from multiple IAQ monitors 10 may be collated, as for example where monitoring goes on at multiple locations in a building and data from these locations is transmitted to a server for analysis and reporting.

Figure 2:
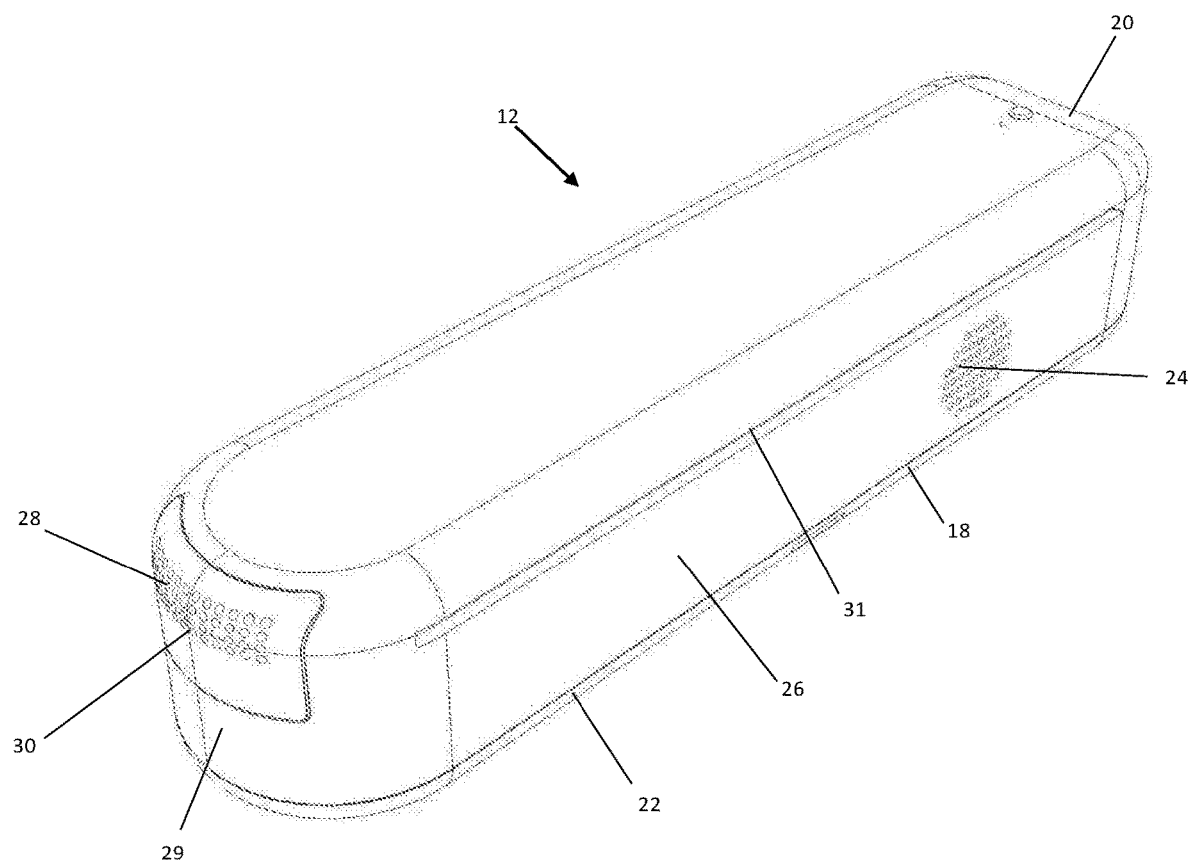
FIG. 2 shows a housing of the IAQ monitor.

Turning now to FIG. 2, the housing 12 comprises a base portion 18 to which a cover portion 20 is releasably coupled, the line of division 22 between these parts being indicated in the drawing. Air is drawn into the housing through a side intake 24 in this embodiment, formed by multiple small apertures in the housing's side wall 26. The lateral direction of the air intake 24 is convenient in terms of packaging in the present embodiment, but in other embodiments the air intake 24 could be differently orientated and in particular it could face along the length of the housing 12. Air is exhausted from the housing 12 through an air outlet 28 formed in this embodiment in an end wall 29 of the housing, and more specifically in a removable closure part 30 of the end wall 29. The air outlet 28 takes the form of multiple small apertures in the closure part 30. Along the side wall 26 (and along its counterpart on the opposite side of the housing, not seen in FIG. 2) is an elongate channel 31 which serves to receive an edge of one of the signal panels 14, in order to mount it.

In operation, air is constantly propelled through the housing 12 from the air intake 24 to the air outlet 28 by means of an electrically driven fan. The word "fan" as used herein refers to any mechanism capable of suitably propelling the air but does not require any particular form of mechanism, which may or may not include a rotary device such as an impeller or propeller. The fan is not depicted in FIG. 2. In the present embodiment it is incorporated in a commercial particulate sensing unit 32 seen in FIG. 3. A frusto-conical duct 34 leads the airflow from the air intake 24 into the particulate sensing unit 32, from which air is exhausted through an upwardly-facing sensor outlet 36.

The particulate sensing unit 32 is of a type known to the skilled person, based on scattering or reflection of emitted light off particles suspended in the air flow, and will not be described in detail herein. Any suitable particulate sensing device may be used in other embodiments of the present invention.

Figure 3:
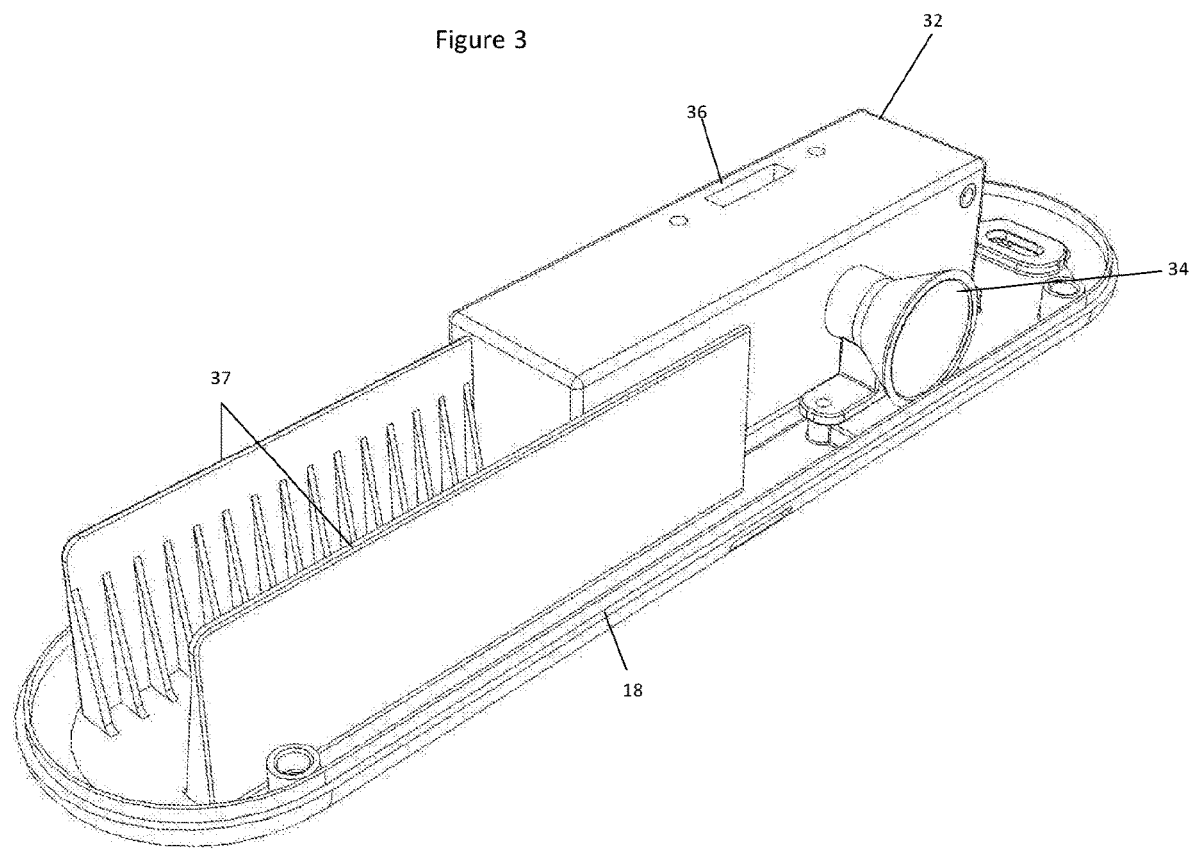
FIG. 3 shows a base part of the housing and certain components carried thereupon, these being revealed by omission of a cover part of the housing.
Figure 4:
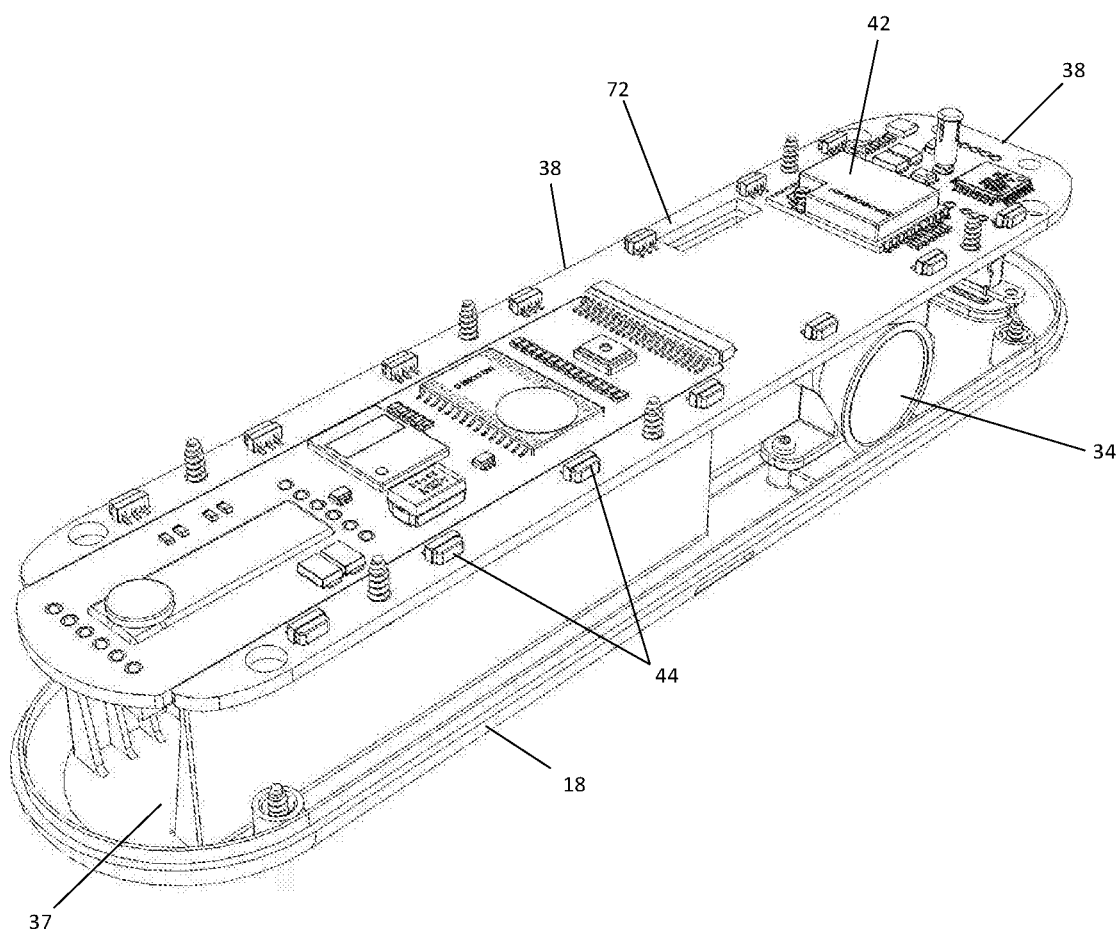
FIG. 4 is similar to FIG. 3 but includes a circuit board.

FIG. 3 shows a pair of upstands 37 carried by and integrally formed with the housing base portion 18. These serve to support a circuit board 38, which is seen in FIG. 4.

The circuit board 38 comprises two spatially separated zones (indicated in FIG. 5b):
i. a first zone 40, which is exposed to the airflow and which contains board-mounted sensors for detection of air quality; and
ii. a second zone 50, 52, 54 which is not subject to the airflow and which contains electronics other than the sensors themselves, among them a microprocessor 42 and associated memory, a WiFi chip including its antenna, and also a set of LEDs 44 for illuminating the signal panels 14.

Looking at FIG. 5, the extent of the first zone is defined by peripheral air guides 46, 48 between which the airflow is constrained to pass. The first zone 40 lies between the peripheral air guides 46, 48 and occupies a central portion of the circuit board 38, extending along part of its length. The second zone includes an end portion 50 but also two peripheral portions 52, 54 alongside the first zone, forming a rough "U" shape. The peripheral portions 52, 54 contain the LEDs 44.

Within the first zone, and mounted on the circuit board 38, are:
first and second chemical sensors 56, 58 responsive to volatile organic chemicals ("VOCs"). The two sensors are responsive to different chemicals or classes of chemicals;
a unit 60 comprising sensors responsive to ambient temperature and relative humidity; and
a $CO_2$ sensor 62 responsive to carbon dioxide concentration.

FIG. 5b includes the aforementioned peripheral air guides 46, 48 and also a pair of intermediate air guides 64, 66, but this drawing omits a top panel 68 of the cover portion 20 of the housing 12. It should be understood nonetheless that the air guides 46, 48, 64, 66 are carried by, and integral with, the top panel 68, as will be clear from FIG. 5a. The lower edges of the air guides 46, 48, 64, 66 rest upon the upper face of the circuit board 38. A flow chamber 70 is thus formed in the region defined between (a) the first zone of the circuit board 38, (b) the peripheral air guides 46, 48 and (c) the top panel 68. It should be noted that this flow chamber is of shallow depth (measured perpendicularly to the circuit board 38), which has beneficial effects. It serves to minimise the flow chamber's cross-sectional area and volume, thus minimising residence time (of air and of the contaminants it carries) in the flow chamber 70. It also helps to ensure that flow over the sensors 56, 58, 60, 62 passes in the desired direction, parallel to the sensors' upper faces, which has been shown to maximise their effectiveness.

Air flow into and through the flow chamber 70 is carefully managed with a view to maintaining laminar (as opposed to turbulent) flow. The pattern of laminar flow created has no local zones of stagnation or recirculation which might increase the residence time of particles and contaminants in such zones. To enter the flow chamber 70, the air exhausted from the particulate sensing unit 32 passes upwardly through an opening 72 in the circuit board (see FIG. 4) after which a curved flow passage formed within a duct arrangement 74 (seen in FIG. 5b) diverts the flow through approximately ninety degrees (about an axis parallel to the length of the housing 12), to be parallel to the circuit board and transverse to it. The flow is then diverted through approximately 90 degrees (about an axis perpendicular to the circuit board 38) by curved regions of the air guides 46, 48, 64, 66, to pass into the flow chamber 70 moving in a direction parallel to the circuit board 38 and running along the length of the housing 12.

The shape of the air guides 46, 48, 64, 66 has been the subject of an iterative design process, with numerous designs being modelled and the resultant airflow simulated by finite element analysis, in order to arrive at the design depicted herein. It will be noted that the air guides 46, 48, 64, 66 form, in the region where the air enters the flow chamber 70, multiple flow passages—in the present embodiment there are three such passages 76, 78 and 80. Each of these flow passages diverges somewhat along the direction of flow. The central flow passage 78 diverges more than the peripheral passages 76 and 80 and so has a large cross-sectional at its open mouth leading to the flow chamber 70. This is because flow speed of air entering the central flow passage 78 is somewhat higher than the speed of air entering the peripheral passages 76, 80. This is compensated for by the divergence of the central passage 78. The three passages 76, 78, 80 each have a curved form, without any discontinuities to create turbulence.

The result, in terms of air flow, is represented in FIG. 6, where each of the numerous lines 82 has been created by numerical simulation and represents a path taken by air moving through the passages 76, 78, 80 and through the flow chamber 70. It can be observed that the flow is highly laminar, with no eddies and no observable turbulence. In addition, modelling shows that flow is highly homogeneous, in that the velocity of air flow varies very little across the width, depth and length of the flow chamber 70. If one considers the air flow as a vector field, the flow vectors at any point in the flow chamber are substantially parallel to those at any other point—that is, there is s single direction of flow and the air moves along substantially straight lines.

This laminar, homogeneous flow of air through a flow chamber of small flow cross section has the important benefit that that the level of any pollutant inside the flow chamber 70 is able to equalise rapidly with the pollutant level in the ambient air. FIG. 10 represents the results of a simulation carried out by one of the inventors using (a) a numerical model of the present IAQ monitor 10, whose results are represented by line 84 and (b) a numerical model of another IAQ monitor, currently among the commercial market leaders, whose results form line 86. The horizontal axis represents time in seconds from introduction of a pollutant into the ambient air. The vertical axis represents the ratio of the pollutant level inside the IAQ monitor to the pollutant level in the ambient air. It can be seen that in the present IAQ monitor 10 the internal pollutant level reaches 90% of the external level within 5 seconds, whereas in the competitor product the same change takes roughly fifty seconds.

Transient effects on air quality are relevant in assessment of air quality and its effects on health. For example, sprays such as deodorants or cleaning products are released rapidly and quite rapidly dispersed or settled, but may have important effects nonetheless. Hence maximising the rate of the response of the IAQ monitor 10 is important. FIG. 11 illustrates the point. Here, boxes 88, 90 represent variations in ambient pollutant level (this example is somewhat simplified in that the pollutant level is modelled as a pair of square pulses.) Lines 89 and 91 represent respectively the responses of the present IAQ monitor 10, and of the aforementioned competitor device. It will be observed that while the present IAQ monitor 10 accurately detects the peak level of the pollutant, the competitor device gives a falsely low reading because it responds so slowly as to fail to reach the true reading. Hence this device potentially gives a falsely reassuring response to such transient events.

It was noted above that some air quality sensors require periodic renewal, or at least checking and recalibration. This is provided for in the present IAQ monitor 10 by enabling the relevant sensors to be easily removed and replaced. With reference to FIG. 8, it must be understood that in the present embodiment the circuit board 38 comprises two separate parts—(a) fixed part 38a and (b) removable part 38b, which forms a sensor module. In the present embodiment the line of division between the fixed and removable parts 38a, 38b corresponds to the division between the aforementioned first and second zones, so that the part of the circuit board corresponding to the first zone and carrying the sensors 56, 58, 60, 62 can be removed for replacement, while the part of the circuit board carrying the remainder of the electronics is fixed in place. Access is gained to the removable circuit board part 38b (hereinafter "the sensor module 38b") by sliding back and removing the closure part 30 of the housing end wall 29, as seen in FIG. 7. The sensor module 38b is then able to be slid out through the resultant opening in the housing end wall 29. FIG. 8 shows the sensor module 38b partially withdrawn from the housing. Longitudinal edges 92, 94 of the sensor module 38b are received as a sliding fit in corresponding grooves (not seen) in the peripheral air guides 46, 48, guiding the board to its required location, and in-line connectors 96, 98 carried respectively on the sensor module 38b and on the fixed circuit board part 38a are arranged to be brought into engagement when the sensor module 38b is slid fully home, so that this action serves to make the necessary electrical connections.

This modular form of construction allows the sensors to be easily removed. The sensor module 38b can then be replaced or re-calibrated and re-installed, as appropriate. In practice an exchange programme may be implemented, where a sensor unit 38b in need of re-calibration is exchanged for a new or re-calibrated unit.

The IAQ monitor 10 will typically be wall-mounted, and FIG. 9 shows threaded fasteners 100 which extend through the base portion 18 of the housing for this purpose (once the fasteners have been screwed through the base portion 38 to secure the monitor to the wall, their heads are covered and concealed by fitting of the housing's cover portion 20). However, FIG. 9 also shows an optional backpack unit 102 which provides PoE ("Power over Electrical wiring") connectivity to a local area network, which may be used in preference to a wire-free LAN, or in addition to it. Power is here provided from a mains electrical supply through cabling 104, although in other embodiments the IAQ monitor 10 may have an onboard battery, which may provide for continued operation in the event of power outages of limited duration.

Sensor data will typically output through the LAN for processing and provision to users through a suitable dashboard, which may be implemented through an application running on a mobile device and/or on a more substantial computer system, which may be the same system used to manage other aspects of the building's management. The data will also typically be output through a wide area network (which may be the internet) to remote servers at which data from numerous sites is collated. These servers may be run by or for, the supplier of the IAQ monitor 10, for example, that company thus being able to collate and to analyse data from the numerous sites on which its products are installed. This bulk data may provide valuable insights in relation to indoor air quality and to the factors affecting it. It may also have commercial value in itself.

However, the present embodiment also provides a very simple and visually conspicuous indication of air quality through the aforementioned signal panels 14. These panels are illuminated in operation by the LEDs 44 in "edge lit" manner. The effect is widely known: light is directed into an edge of the panel and propagates through it due to partial internal reflection at the panel's faces, so that the panel is seen to glow. In the present embodiment the signal panels 14 comprise acrylic, which is very suitable for this "edge lit" effect. The LEDs each comprise multiple light emitting junctions operating at different wavelengths, so that the colour of the signal panels 14 can be varied under the control of the on-board microprocessor 42. In the present embodiment, this microprocessor is programmed to undertake simple analysis of the sensor output data and to adjust the light provided to the signal panels 14 accordingly. Specifically, the microprocessor may be programmed to select between three states: (a) good air quality, indicated by green light from the display panels 14; (b) moderate air quality, indicated by amber light; and (c) poor air quality, indicated by red light. The display panels give the occupants of a room a clear and immediate signal of the current quality of the local air, and a clear signal to take remedial action if the air quality is poor.

In addition to sensing indoor air quality, the present embodiment is able to sense other aspects of the indoor environment which affect its occupants. Specifically, it has a microphone responsive to ambient noise, and a light sensor. The microphone may be a MEMs type device, although a range of different microphone technologies may be adopted. The light sensor may be a single device, or may comprise multiple sensors responsive to different frequencies. For example independent measurements may be provided of UVa, UVb, infra-red, and of visible light intensity.

FIG. 12 depicts an IAQ monitor 10a which is a further embodiment of the invention and has much in common with the embodiment described above. It differs from the earlier embodiment in that it comprises a base unit 150 and a sensor unit 152, these two units being configured to couple to one another but to be separable. The sensor unit 152 is able to be removed from the base unit 150 and sent for servicing, which may for example include calibration and testing of the sensors. The sensor unit 152 contains the sensors and with regard their mounting and to the management of airflow it may be similar to the earlier embodiment depicted especially in FIGS. 3 to 7. The base unit 150 is in this example wall-mountable, and it carries the display panels 14, as well as one or more ports for connection to an electrical power supply and, in some embodiments, its wired computer network. In the present embodiment, power to run the sensor unit 152 is transferred from the base unit 150 to the sensor unit 152 through electromagnetic wireless power transmission, a technology already widely adopted in relation to wireless charging of mobile phones. In the illustrated embodiment a power emitter is wholly or partly housed in a stub 154 formed on the base unit 150, and the sensor unit 152 has a complementary recess (not seen in FIG. 12) to receive the stub 154 when the two units are coupled. A power receiver is disposed in the sensor unit 152 in the vicinity of the recess. Other embodiments may use conventional electrical connectors, arranged to be mated when the two units 150, 152 are coupled together, for transfer power and/or of data between them. In the illustrated embodiment the base unit 150 carries magnets 156 and the sensor unit 152 carries complementarily arranged magnets which are not seen in the drawings, so that when the two units are brought together, magnetic attraction serves to releasably couple them. Removal of the sensor unit 152 is thus very straightforward—the user simply withdraws it from the base unit 150 with sufficient force to overcome the magnets.

The invention claimed is:

1. An indoor air quality monitor comprising:
a housing including a housing panel and an air guide arrangement, the housing provides an air intake leading via a flow path, which is formed within the housing and which comprises a flow chamber, to an air outlet;
a fan arranged to propel air from the air intake through the flow path to the air outlet;
at least one sensor which is for sensing at least one air pollutant, the sensor being exposed to air in the flow chamber; and
the air guide arrangement which is downstream of the air intake in the flow path and which divides the flow path into a plurality of flow passages each of which opens into the flow chamber, so that air flow into the flow chamber is divided between the flow passages, wherein the sensor is disposed on a circuit board, and the flow chamber is defined between:
the circuit board;
the housing panel; and
a pair of peripheral air guides extending between the circuit board and the housing panel.

2. The indoor air quality monitor as claimed in claim 1, wherein the flow passages each have a cross-sectional area that increases along a direction of air flow.

3. The indoor air quality monitor as claimed in claim 2, wherein the flow passages are each curved to change the direction of the air flow.

4. The indoor air quality monitor as claimed in claim 3, wherein the flow passages change the direction of the air flow by approximately ninety degrees.

5. The indoor air quality monitor as claimed in claim 1, wherein the flow passages include first, second, and third flow passages, the first and second flow passages being disposed on opposite sides of the third flow passage, and the third flow passage having a downstream end having a cross-sectional area larger than individual cross-sectional areas of a downstream end in each of the first and second flow passages.

6. The indoor air quality monitor as claimed in claim 1, wherein the circuit board has first and second faces, wherein the first face carries the sensor and lies toward the flow chamber, and wherein the flow passages are configured to output air into the flow chamber along a direction substantially parallel to the first face.

7. The indoor air quality monitor as claimed in claim 6, wherein the flow path leads through an opening in the circuit board, downstream of which the flow passages are each curved to divert the air along a direction substantially parallel to the first face of the circuit board.

8. The indoor air quality monitor as claimed in claim 1 further comprising two or more intermediate air guides each disposed between the peripheral air guides and each extending between the circuit board and the housing panel, so that the flow passages are each formed either between a pair of intermediate air guides or between an intermediate air guide and a peripheral air guide.

9. The indoor air quality monitor as claimed in claim 8, wherein the peripheral and the intermediate air guides are each carried by the housing panel.

10. The indoor air quality monitor as claimed in claim 1, wherein a depth of the flow chamber perpendicularly to the circuit board is less than 10 mm.

11. An indoor air quality monitor comprising:
- a housing including a housing panel and an air guide arrangement, the housing provides an air intake leading via a flow path, which is formed within the housing and which comprises a flow chamber, to an air outlet;
- a fan arranged to propel air from the air intake through the flow path to the air outlet;
- at least one sensor for sensing at least one air pollutant, the sensor being exposed to air in the flow chamber; and
- the air guide arrangement is downstream of the air intake in the flow path and forms a plurality of flow passages through each of which air passes in operation of the indoor air quality monitor to reach the flow chamber, wherein the sensor is disposed on a circuit board, and the flow chamber is defined between:
  - the circuit board;
  - the housing panel; and
  - a pair of peripheral air guides extending between the circuit board and the housing panel, and
- wherein the flow passages include two peripheral passages on either side of a central passage, and the central passage having a cross-sectional area at the downstream end larger than the individual cross-sectional area of each of the peripheral passages at their downstream ends.

* * * * *